April 11, 1944.  W. M. ZAIKOWSKY  2,346,203
WELL LOGGING METHOD
Filed Dec. 7, 1940
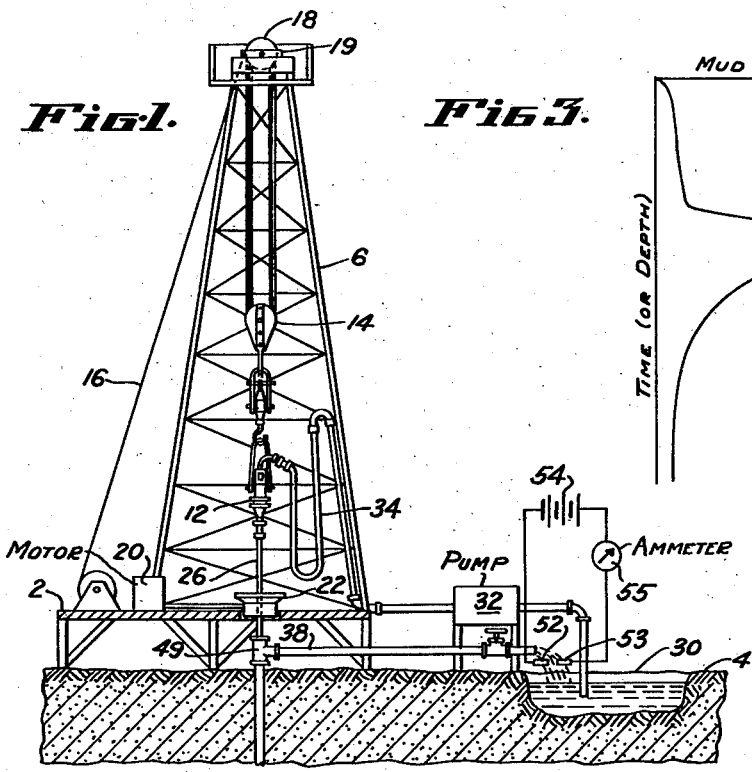
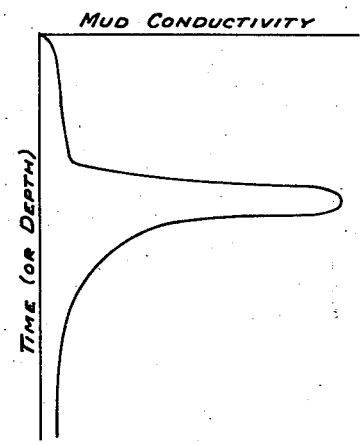
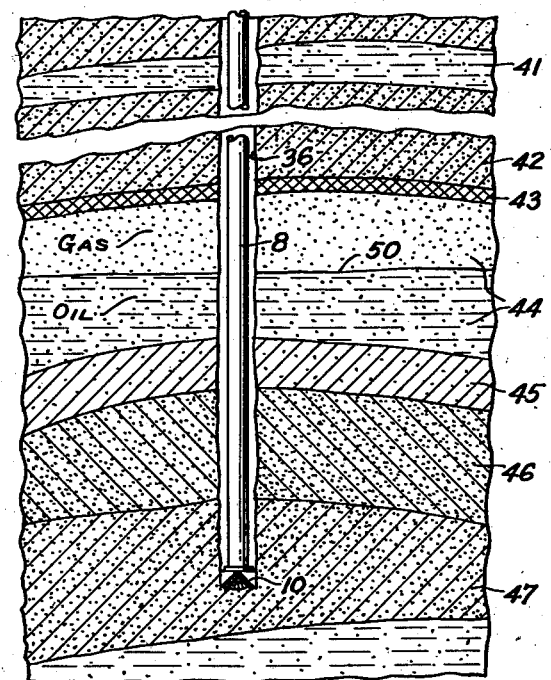
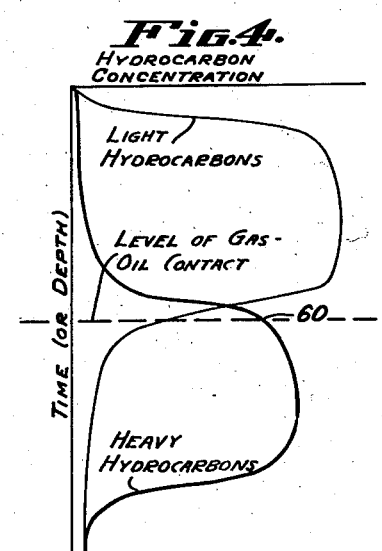
INVENTOR.
WLADIMIR M. ZAIKOWSKY.
BY
ATTORNEYS Patented Apr. 11, 1944

2,346,203

UNITED STATES PATENT OFFICE 2,346,203

WELL LOGGING METHOD

Wladimir M. Zaikowsky, Pasadena, Calif., assignor, by mesne assignments, to Consolidated Engineering Corporation, Pasadena, Calif., a corporation of California Application December 7, 1940, Serial No. 369,065

13 Claims. (Cl. 73—51)

My invention relates to methods for logging fluid flow lines, and especially to a method for logging the formations which are intersected by a bore hole which has been drilled into the earth. In particular, my method provides for detecting and measuring the flow of any fluid to or from said formations into the bore hole. My method is useful in locating minerals of all types and is particularly useful in locating water intrusions, gas and oil bearing strata, and the gas-oil contact in a petroleum bearing formation.

Former methods of bore hole logging have generally been of two types. In the first type, measurements of the physical characteristics of the formations which intersect a bore hole have been determined by electrical, magnetic, or acoustic methods which give only an indirect indication of the nature of the various formations. Such methods suffer from the disadvantage of not indicating directly the nature and composition of any fluids, minerals, or other components which may be present in the respective formations. In the second type of bore hole logging method, samples of mud are collected at the output end of a mud circulating cycle during the progress of drilling. The mud collected is then analyzed for hydrocarbons or other fluids in order to determine the exact nature of the fluid contained in the formations being penetrated by the drill bit. This method, however, suffers from the disadvantage that the rate at which mud passes the drill bit is usually many thousand times greater than the rate at which the formation is being drilled away. As a result, the fluids which enter the mud from the formation being drilled away are very highly diluted. However, even in spite of this dilution this second type of well logging method is very useful in detecting hydrocarbons present in the formations being penetrated by the drill.

My present method of well logging differs from prior methods in that the nature of intruded fluids or other migrated materials is determined directly and differs from prior methods of hydrocarbon well logging principally by virtue of the fact that hydrocarbons may be detected in formations subsequent to the penetration of said formations by the drill.

My present method is also useful in detecting the location of leaks to or from pipe lines, for example, a leak of salt water into a fresh water pipe line, and is also useful in detecting points of electrolysis in fluid conduits.

According to my invention, as applied, for example, to the drilling of oil wells, I suspend drilling operations for a predetermined length of time, and during this time let the drilling mud remain stationary in the bore hole, subsequently resume circulation, preferably without resuming drilling, and measure the chemical or physical character of various portions of mud which then return to the surface from various levels in the bore hole. From such analysis I am able to determine any interaction, whether chemical or physical, which has occurred between the well fluid and the walls of the bore hole.

The general theory of my method is simply that during the time when mud circulation is suspended, fluids which are present in various formations intersecting the bore hole flow or diffuse, or in some other way migrate from the formation into the mud which fills the bore hole or vice versa. The length of time which I prefer to let the mud stand before resuming circulation depends upon many factors, such as for example, the pressure of the mud at the well head, the particular area under investigation, and the known characteristics of the formation or fluid to be located. In general, however, the time during which I permit the circulating mud to stand, is large enough to permit substantial quantities of formation fluids to migrate or diffuse into the mud and yet, not so long as to permit such fluids to travel by gravity or diffusion to points remote from the points of intrusion. While I shall describe my invention with particular reference to drilling operations utilizing drilling mud, it is to be understood that my invention may also be utilized when other fluids are circulated in the well for any purpose whatever. As applied to other types of mineral prospecting the interaction between the fluid and the formation may be of a chemical character. The fluid filling the bore hole may include a salt, acid, or base which is used to accelerate, slow up, or to stop the exchange of minerals between various geologic strata of the earth and the fluid filling the bore hole.

The principal object of my invention is to provide a novel, sensitive, and inexpensive method of mineral prospecting which overcomes the limitations of prior methods.

Another object of my invention is to provide a method for locating a point at which a leak or other anomaly exists in a fluid flow line.

Another object of my invention is to provide a method for locating fluid intrusions or extrusions in a bore hole.

Another object of my invention is to provide a method of hydrocarbon well-logging.

Another object of my invention is to provide a method for determining the extent and effect of interchanges or interaction which occur between a fluid filling the bore hole and minerals present in the formations intersecting said bore hole.

Still another object of my invention is to provide a method of determining the gas-oil contact of a petroleum producing zone which has been penetrated by a drill.

My invention possesses numerous other objects and features of advantage, some of which, together with the foregoing, will be set forth in the following description of specific apparatus embodying and utilizing my novel method in locating intrusions of certain specific fluids. It is therefore, to be understood that my method may be practiced with other apparatus and is applicable to other minerals and that I do not limit myself, in any way, to the apparatus or minerals of the present application, as I may locate other minerals and adopt various other apparatus embodiments, utilizing the method, within the scope of the appended claims.

Fig. 1, which is partly schematic and partly in section, shows a typical organization of surface drilling equipment to which my invention is applicable.

Fig. 2, drawn to a larger scale than Fig. 1, shows a section of the earth to which my invention is applicable.

Figs. 3 and 4 represent well logs obtained in accordance with my invention.

Referring to Figs. 1 and 2, a platform 2 mounted on the surface 4 of the earth has constructed thereon a derrick 6, which is used to support and manipulate a drill pipe 8, having a bit 10 on the bottom end thereof for drilling through subsurface formations. The drill pipe 8 is connected at its upper end to a swivel 12, which in turn is supported by a travelling block 14. The drill pipe 8 may be raised or lowered in the bore hole by taking up or letting out the drill cable 16 which passes several times over the pulley 18 on crown block 19 and a pulley on the travelling block 14.

During the drilling operation, rotary motion is supplied to the drill pipe 8 and bit 10 by suitable transmission of energy from a motor 20 to a rotary table 22 mounted on platform 2, said rotary table being adapted to transmit motion to the drill pipe 8 through a kelly 26, which forms the uppermost section of said drill pipe.

In order to lubricate the drill bit 10 during drilling and in order to remove drill cuttings from the drill hole, as the drill penetrates the formations, mud of suitable constituency is customarily pumped from the sump 30 by a pump 32 through the hose 34 and swivel 12 into a continuous passage which extends throughout the entire length of the drill pipe 8 from kelly 26 to bit 10.

In the usual practice, mud circulates downward inside the drill pipe and returns upward in the annular space between the drill pipe and the wall of the bore hole, and is discharged into the sump 30 through a discharge pipe 38.

In Fig. 2, I have illustrated in a very general way some of the types of formations which may intersect a bore hole which is being or has been drilled into the earth. Stratum 41 represents a sand containing connate waters consisting of a highly concentrated salt solution. Stratum 42 represents a clay formation. Stratum 43 represents a shale which serves as a cap rock for underlying gas and oil. Stratum 44 represents a sand which contains both gas and oil located respectively in the upper and lower portions of said stratum. Strata 45, 46, and 47 represent miscellaneous layers which lie beneath the oil bearing zone represented by stratum 44.

Occasionally, it is necessary in the course of drilling to determine the location of a stratum 41 from which undesirable water is flowing into a bore hole. In many instances it is desirable to locate a petroleum bearing formation such as stratum 44, which was not detected at the time the drill bit penetrated such formation. Even when the presence of a petroleum bearing formation such as stratum 44 has once been located, it is still frequently desirable to locate the gas-oil contact 50 which represents an interface which separates regions of low and high gas-oil ratios as great economies in production can be achieved by setting the casing just below the gas-oil contact in order to conserve formation pressure.

In order to locate a point at which water intrusion is occurring, or to locate a petroleum bearing stratum, or to locate the gas-oil contact in a producing horizon, I suspend drilling operations for a predetermined time, preferably continuing mud circulation at a standard pumping rate for several complete mud circulating cycles in order to fill the annular space between the drill stem and the wall of the bore hole with a substantially homogeneous mixture. I then stop mud circulation for a predetermined time interval. During this time interval the mud communicates with various formations, either by direct contact or through the mud cake 36 so that connate waters, gas, and oil have a tendency to flow into the mud and mix therewith.

Of course, if the pressure of the mud exceeds the formation pressure by a large amount, there will be a strong tendency for any gas and oil that might be present in such formation to be held back. However, even under the most adverse conditions, there will be a certain degree of migration of the gas and oil into the mud by diffusion. In fact, gas and oil can diffuse into the mud even through a mud cake 36, which is a semi-porous mud deposit which is generally formed on the wall of a bore hole in order to seal said wall.

After the mud has stood long enough to give the fluids under investigation an opportunity to migrate into the mud and yet not so long as to allow said fluids sufficient time to move to points remote from the formations in which they originate, I resume mud circulation.

As the mud comes out of the well and is being discharged into sump 30, I collect samples of the mud at measured time intervals following the resuming of circulation. Knowing the volume of the annular space between the drill stem and the casing or the bore hole wall, and the rate of mud input I am able to compute the depth at which each of the collected samples stood while circulation was suspended. I analyze each of said samples in any convenient manner to determine the physical or chemical characteristics of any fluids which have flowed into the mud, or any other changes in the characteristics of the drilling mud which have occurred while the drilling mud was at rest in the bore hole.

The results of such analyses plotted against depth provide well logs of the types shown in Figs. 3 and 4.

In applying my method it is frequently desirable to make background correction, that is, to correct for the change in fluid content that occurs in the normal course of circulation. One way to make such corrections is to pump out at the same standard pumping rate as was used prior to suspending circulation, and to compare the analyses of the mud samples which appear at the output after resuming circulation with a standard mud sample which appeared at the output just prior to suspending circulation. This standard reference sample will normally reflect the changes which occur during normal circulation and therefore represents the changes in the samples that occur during the circulation thereof at times in the circulating cycle other than the period during which the circulation is suspended.

The background may be made negligible compared to the significant changes which are being measured by simply circulating the fluid as rapidly as possible.

However, it is to be understood that the making of background corrections is not absolutely essential to my method as the results of analyzing samples which have stood at different points in the bore hole may be compared with each other to determine the relative conditions at different points of said bore hole. Differences in the fluid samples reflect inhomogeneities along the length of said bore hole. However, for the reasons given hereafter it will be clear that slowing pumping rates are preferable.

If I am interested only in salt water intrusion, I measure the conductivity of the mud which is returned to the surface when circulation is resumed. Conductivity may be measured, for example, by passing the mud between two electrodes 52 and 53 connected in series with a battery 54 and a recording galvanometer 55. By observing variations of mud conductivity as a function of time (and therefore depth) I am able to determine the exact level at which water intrusion is occurring. A graph of mud conductivity vs. depth is shown in Fig. 3.

In the discussion given hereinabove it has been assumed that the bore hole is of regular and known shape. However, if this is not the case I may empirically determine the time required for mud to travel from any subsurface elevation to the surface by raising the drill pipe in the bore hole until the bottom of the drill pipe is at the elevation in question, then circulating mud down the drill pipe and back to the surface at normal pumping speed, and subtracting the time required for mud to reach the bottom of the drill pipe from the time required to complete the cycle. The time required for mud to make the complete cycle is easily measured by introducing a characteristic marker such as a dye of distinctive color into the mud before it enters the well. By making a series of such time-depth measurements a complete calibration for the well may be obtained regardless of irregularities of the bore shape. Other methods of relating the times of sample collection to the depths at which the samples stood will readily occur to those skilled in the art. In applying my method to problems of well cementing or acid treatment, it is often unnecessary to know the exact position in the well at which cementing or acid treatment is desired, but only the total volume of fluid which must be pumped into the well in order to convey a charge of cement or acid from the surface into the position in the well at which it is desired for such cementing or acid treatment to take place; in such cases, there is no necessity to express the drilling mud analyses as a function of depth, but only in volume of mud pumped.

Not only may my method be utilized for detecting flow of fluids into the mud, but it may also be used to detect loss of well fluid into the formation. In the latter case, the loss of water from the mud brings about a measurable increase in the density of the remaining mud fluid. Thus density measurements may be made to measure any interchange whatever between the well fluid and the formations.

In order to locate a petroleum bearing zone which intersects the bore hole, I prefer to analyze a plurality of successively obtained mud samples for hydrocarbons by any suitable method, and correlate hydrocarbon content with depth in accordance with principles hereinabove explained.

In order to locate the gas-oil contact in a petroleum bearing zone I take samples at intervals closely spaced compared to the thickness of said zone, preferably no more than a few feet apart, and analyze each of said samples to determine the relative quantities of light and heavy hydrocarbons contained therein. This analysis may be carried out, for example, by bringing each of said collected samples to a laboratory in an air-tight container and there determining the relative quantities of light and heavy hydrocarbons present in said sample by extracting the hydrocarbons from said samples and separating the recovered hydrocarbons into light and heavy fractions by temperature fractionation. By making such measurements on samples obtained from spaced positions between about six inches and two feet apart, the gas-oil contact in a producing horizon may be accurately located and the optimum position for setting the casing accurately established.

In Fig. 4 I have plotted graphs showing the quantities of light and heavy hydrocarbons obtained from a succession of samples obtained from a plurality of closely spaced points in the petroleum bearing horizon represented by stratum 44. The gas-oil ratio at different depths in the zone under investigation is obtained by dividing the quantity of light hydrocarbons by the quantity of heavy hydrocarbons recovered from the points under investigation.

From an examination of the curves shown in Fig. 4, it will be clear that the lowest level 60 at which the gas-oil ratio is very high, may be taken as the location of the gas-oil contact for all practical purposes. By setting the casing below this point, economical production may be obtained for a long period.

It is to be understood that my invention is also applicable to the detection and location of subsurface mineral deposits other than petroleum. Many minerals may be located by means of a modified form of my method by filling a bore hole with a fluid which will react with the mineral deposit in any characteristic manner, recovering fluid samples from different levels of the bore hole, and observing the results of any interaction which has occurred between the fluid and the walls of the bore hole. Salts present in the formations intersecting a bore hole may be located by contacting the formation with a suitable fluid solvent for a predetermined time, recovering the solvent by the method hereinabove described, and measuring the quantities of significant solute present in different samples of the recovered fluid.

In applying my method I prefer to use a viscous or jell-forming fluid which will tend to seal the walls of the bore hole to prevent extensive leakage to or from the formations. However, if the walls are not completely sealed and there is any substantial sinking of the fluid due to losses to very porous formations, and I desire to investigate the formations above the point at which such leakage occurs, I prefer to pump fluid into the well at or below the point in question in order to maintain a stationary fluid condition at the depths under investigation.

From a consideration of the above description of my invention, it will be clear that I have provided a simple and economical method of logging the formations which intersect a bore hole, and that my method is particularly useful for locating water intrusions, formations capable of producing petroleum, the gas-oil contact in a petroleum producing zone, and other valuable mineral deposits. The method of my invention is direct, in that it provides for the analysis of mud for the chemicals directly related to the minerals it is desired to locate in the well and is particularly useful in logging formations after they have been already penetrated by the drill. My invention is particularly useful in oil well treatment procedures, such as cementing or acid treatment procedures, as in such procedures I can make well logs according to my method, both before and after treatment and compare the two well logs in order to determine the effectiveness of said treatment.

In general, my method comprises suspending fluid circulation in any fluid flow line under investigation a sufficiently long length of time to permit striation to occur in the fluid column filling said line as a result of the interaction between said fluid and the walls of said line. Such interaction may be physical or chemical and it may represent an addition to or a loss from the fluid in the line, or both. After such striation has developed, fluid flow is preferably resumed at such a rate as to avoid turbulence, thus preserving laminar flow and the significant striation. Slow circulation after suspension is especially desirable when the line has bends or irregularities therein and when the striations are closely spaced. Measurements are made on the fluid flowing out of the line, preferably by collecting samples at the line output at measured time intervals, analyzing said samples to determine changes in the character thereof resulting from interaction with the line wall during suspension of flow, and relating the times of collection to the positions in the flow line at which the samples stood during the time when flow was suspended.

As hereinabove stated, the interaction between the fluid and the line may be either physical or chemical. It may, for example, be an actual chemical change resulting from contact between the fluid in the line with the materials in the walls, or it may result in a change in alkalinity, acidity, or salt content as a result of the exposure of fluids to the influence of the walls during suspension of circulation. Or it may simply be a change in concentration of the salts normally present in the line resulting from differential leakage into or out of the line.

Thus, it will be seen that I have provided a novel method of investigating the condition of normally inaccessible walls of a fluid flow line.

I claim:

1. The method of logging formations in the course of a drilling process utilizing a circulating fluid, which comprises the steps of suspending fluid circulation to permit portions of drilling fluid to communicate for a substantial period of time with said formations, subsequently resuming fluid circulation, collecting a succession of fluid samples returning to the surface at measured time intervals after resuming circulation, relating the times of collection to the depths at which the respective samples stood for said period, and analyzing each of said samples to determine the nature and extent of any interaction which has taken place between the sample and the formation at the depth at which said sample stood for said period.

2. The method of bore hole logging which comprises causing different portions of a fluid column to interact substantially simultaneously with corresponding formations at different levels of a bore hole, thereby subjecting said portions to a change in characteristic in accordance with the nature of the corresponding formations, recovering portions of said fluid column from different levels of said bore hole after interaction with the respective formations, while preserving in the individual portions indications of any such interactions, analyzing each of said portions with respect to charges in said characteristic to determine the natures of the formations present at different levels of said bore hole.

3. The method of bore hole logging which comprises causing different portions of a fluid column to interact substantially simultaneously with formations at different levels of a bore hole, subsequently forcing the fluid in said column to the surface of the earth, collecting a succession of fluid samples returning to the surface at measured time intervals, relating the times of collection to the depths at which the respective samples interacted with the formations penetrated by said bore hole, and analyzing each of said samples to determine the nature and extent of such reaction at different levels of said bore hole.

4. The method of bore hole logging which comprises circulating a fluid into and out of a bore hole, suspending fluid circulation for a sufficient period of time to permit said fluid to interact with formations forming the walls of said bore hole, resuming fluid circulation, collecting samples of said fluid as it circulates out of said bore hole after said suspension of circulation, analyzing said samples, also collecting and analyzing a sample which has been circulated into and out of the bore hole just prior to said suspension of circulation, and comparing the contents of said samples collected after said suspension of circulation with the contents of a similar said sample which circulated into and out of the bore hole just prior to suspension of circulation, to determine the nature and extent of any interaction which has occurred between said fluid and said formations.

5. The method of determining variation in the condition of a heterogeneous surface incapable of direct examination which comprises applying a substantially homogeneous material simultaneously to parts of said heterogeneous surface of differing character, thereby subjecting different portions of said homogeneous material to a change in characteristic in accordance with the character of the parts of said surface contacted, removing portions of said material from said surface in a predetermined relation to the extent of said surface after static exposure of said material to said surface while preserving in the removed portions of material indications of any such change in characteristic, and analyzing individual portions of the removed material to determine departure from homogeneity caused by interaction of different areas of said surface with said material.

6. The method of determining the condition of a fluid flow line at a plurality of spaced points along the length thereof which comprises suspending flow in said line for a time sufficiently long to produce changes in the fluid content at different points as a result of departure from homogeneity in the walls of said line, resuming flow in said line, analyzing portions of the fluid thereafter flowing out of said line with respect to said changes in content, and determining the positions of said line contacted by the respective analyzed fluid portions during the suspension of flow whereby the position of any such departure in said walls may be located.

7. The method of determining the condition of a fluid flow line at a plurality of spaced points along the length thereof which comprises suspending flow in said line for a predetermined time sufficiently long to produce changes in the fluid content at different points thereof as a result of departure from homogeneity in the walls of said line, said changes in fluid content being in the form of striations along the length of the fluid column, initiating flow slow enough to preserve the distinctive character of striations formed in the fluid column filling said line as a result of said suspension of flow, analyzing portions of the fluid thereafter flowing out of said line with respect to said changes in content, and determining the positions of said line contacted by the respective analyzed fluid portions during the suspension of flow whereby the position of any such departure in said walls may be located.

8. The method of determining the effects of treating a well by any predetermined treatment procedure that affects the formations penetrated by the well, which comprises preparing a well log before and after treatment, each said well log being prepared by circulating fluid in a well to produce a homogeneous fluid mixture, suspending circulation sufficiently long to enable the fluid to interact with formations at different levels, subsequently collecting samples of said fluid after interaction with the respective formations, analyzing said collected samples with respect to effects of said interactions, and plotting the results of sample analysis as a function of the depth at which the respective sample interactions have occurred, whereby the effects of said treatment procedure may be ascertained by comparing said well logs.

9. In well logging which involves circulating fluid in a section of a well to render the fluid therein of substantially uniform composition, and suspending circulation an appreciable time to foster changes in fluid composition by virtue of interaction of portions of the fluid with formations at different levels in said well, the improvement which comprises removing from the well portions of the fluid which have been suspended at different levels therein while preserving the changes in composition of the individual fluid portions, and testing them with respect to such changes to determine the nature of formations at the respective levels.

10. The method of logging a well in the course of drilling which comprises the steps of circulating the drilling mud to obtain a standard sample for analysis, suspending circulation an appreciable time to foster infiltration of fluids from strata at different levels in the well into the drilling mud to create zones of dilution in the drilling mud, and resuming slow circulation to elevate such zones to the surface for sampling and analysis, whereby standard and treated samples may be compared to determine the kind and amount of infiltrated fluids.

11. In well logging, the improvement which comprises circulating fluid between two points in a well at a predetermined rate to obtain a standard sample for analysis, suspending circulation an appreciable time to foster changes in fluid composition by virtue of interaction of the fluid with formations at different levels between said points and to thereby create striations in the fluid composition along the length of the well, resuming circulation at substantially the same rate to flow the fluid past one of said points, said rate being such that said fluid striations are preserved during said flow, and sampling portions of the fluid from different levels as they flow past said one point, whereby said portions and a standard sample may be compared to determine the occurrence of any such striation.

12. In logging formations intersecting a well which involves circulating a fluid between the top and the bottom of the well, and suspending fluid circulation to permit portions of the fluid to communicate for a substantial period of time with the formations, thereby subjecting some of said fluid to a change in characteristic in accordance with the character of the formations with which the respective portions communicate in that time, the improvement which comprises removing said fluid portions from the well while preserving such change in characteristic in the individual portions, and analyzing each removed portion with respect to such change in said characteristic.

13. A method of determining the nature of a formation at a predetermined level in a well out of which well fluid leaks at a point beneath said level, which comprises maintaining a stationary fluid condition at said level for a predetermined time by pumping fluid into the well beneath said level to counteract the leakage, thereby subjecting a portion of the fluid to a change in characteristic in accordance with the nature of the formation it contacts, and analyzing said fluid portion to determine such a change of characteristic therein.

WLADIMIR M. ZAIKOWSKY.

CERTIFICATE OF CORRECTION.

Patent No. 2,346,203. April 11, 1944.

WLADIMIR M. ZAIKOWSKY.

It is hereby certified that error appears in the printed specification of the above numbered patent requiring correction as follows: Page 3, first column, line 28, for "reffect" read --reflect--; page 4, second column, line 55, claim 4, after "of" strike out the words "a similar"; and that the said Letters Patent should be read with this correction therein that the same may conform to the record of the case in the Patent Office.

Signed and sealed this 29th day of August, A. D. 1944.

(Seal)

Leslie Frazer

Acting Commissioner of Patents.